(12) United States Patent
Goertz (10) Patent No.: US 9,032,419 B2
(45) Date of Patent: May 12, 2015

(54) APPLICATION FUNCTION LIBRARY FRAMEWORK

(75) Inventor: Peter Goertz, Durmersheim (DE)

(73) Assignee: SAP SE, Walldorf (DE)

( * ) Notice: Subject to any disclaimer, the term of this patent is extended or adjusted under 35 U.S.C. 154(b) by 720 days.

(21) Appl. No.: 13/329,196

(22) Filed: Dec. 16, 2011

(65) Prior Publication Data

US 2013/0159966 A1    Jun. 20, 2013

(51) Int. Cl.
*G06F 9/44* (2006.01)

(52) U.S. Cl.
CPC .. *G06F 9/443* (2013.01); *G06F 8/34* (2013.01)

(58) Field of Classification Search
None
See application file for complete search history.

(56) References Cited

U.S. PATENT DOCUMENTS

| | | | |
|---|---|---|---|
| 5,987,463 A * | 11/1999 | Draaijer et al. .................. | 1/1 |
| 6,049,800 A * | 4/2000 | Govindarajan et al. .............. | 1/1 |
| 6,499,137 B1 * | 12/2002 | Hunt ............................ | 717/164 |
| 7,325,007 B2 * | 1/2008 | Castro et al. ..................... | 1/1 |
| 8,019,784 B2 * | 9/2011 | Bendel et al. .................. | 707/795 |
| 2006/0200486 A1 * | 9/2006 | Castro et al. .................. | 707/102 |
| 2013/0091203 A1 * | 4/2013 | Araki ........................... | 709/203 |

OTHER PUBLICATIONS

Haendel, L., "The Function Pointer Tutorials", newty.de [online], 2005 [retrieved Sep. 6, 2014], Retrieved from Internet : <URL: http://www.newty.de/fpt/zip/e_fpt.pdf>, pp. 1-13.*
Anonymous, "Calling External Procedures", Oracle [online], 2005 [retrieved Sep. 6, 2014], Retrived frim Internet: <URL: http://docs.oracle.com/cd/B10501_01/appdev.920/a96590/adg11rtn.htm>, pp. 1-31.*

* cited by examiner

*Primary Examiner* — Don Wong
*Assistant Examiner* — Todd Aguilera
(74) *Attorney, Agent, or Firm* — Mintz Levin Cohn Ferris Glovsky and Popeo, P.C.

(57) ABSTRACT

A component instance manager of a database system generates an instance of the application function. The component instance manager then generates an executor for the application function, and requests an instance of a component class of the application function from a package manager of the database system. A void pointer associated with the instance of the component class and a wrapper function address associated with the application function are accessed by the component instance manager, where the void pointer and wrapper function address comprise runtime parameters of the application function. The application function is thereafter executed by the executor according to the runtime parameters.

3 Claims, 3 Drawing Sheets

APPLICATION FUNCTION LIBRARY FRAMEWORK

TECHNICAL FIELD

The subject matter described herein relates to in-memory database (IMDB) systems, and more particularly to an application function library that is external to the executable kernel of the IMDB.

BACKGROUND

In some modern database systems, such as the HANA in-memory database (IMDB) by SAP AG of Walldorf Germany, a function in an external library is either a C-style function, or a method of a C++ class. In the first case, a symbol address of the function must be determined and cast to an appropriate function pointer. Then, the function pointer must be filled with the function parameters, after which the function pointer can be executed. In the second case, the C++ class must be instantiated to run the function.

In the former case, it is impossible to have all kinds of function pointers defined in the kernel coding to cover all possible parameters, and restricting application functions to a limited set of signatures is not desirable. In the latter case, the class is not known in the kernel coding. Accordingly, what is needed is a solution to make an existing IMDB kernel aware of new external function libraries.

As functions are contained in C++ libraries, it is not just an SQL-like "create procedure . . . as . . ." statement that needs to be executed for registering the functions as database procedures in the database catalog if the function is supposed to be called as procedure. However, a detailed description of the parameters needs to be transferred to the database catalog. Using one example, describing an ABAP structure or table parameter is different than just specifying an int parameter. For example, the alignment of the members within a structure or table has to be known, and may be platform dependent. So, the task of specifying detailed parameter descriptions cannot be done by application logic developers.

Another problem with external function libraries is that to access their functions, the library must be loaded. Managing who controls the loading of the library, keeping track of symbols being used for the functions and/or library, and managing how and when a library may be unloaded are critical considerations. For example, attempting to access a symbol in a library after that library is unloaded will lead to a crash of the index server of the IMDB, even if the library is later reloaded. Implementing a library management mechanism for each kind of library is infeasible and in most cases impossible, as libraries are developed independent of the kernel.

SUMMARY

This document describes a system and method providing an application function library framework, for managing and making known to an IMDB kernel new function libraries that are external the kernel.

In one aspect, a method for executing an application function in a database system is presented. The method includes generating, by a component instance manager of a database system, an instance of the application function. The method further includes generating, by the component instance manager, an executor for the application function, and requesting, by the component instance manager, an instance of a component class of the application function from a package manager of the database system. The method further includes accessing, by the component instance manager, a void pointer associated with the instance of the component class, and a wrapper function address associated with the application function, the void pointer and wrapper function address forming the runtime parameters of the application function. The method further includes executing the application function by the executor according to the runtime parameters.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a common call mechanism for application function libraries that provide database application functions, and which are linked dynamically to the database kernel on demand for execution. A package manager supports the execution. A package is form of a library including metadata describing the library.

Figure 1:
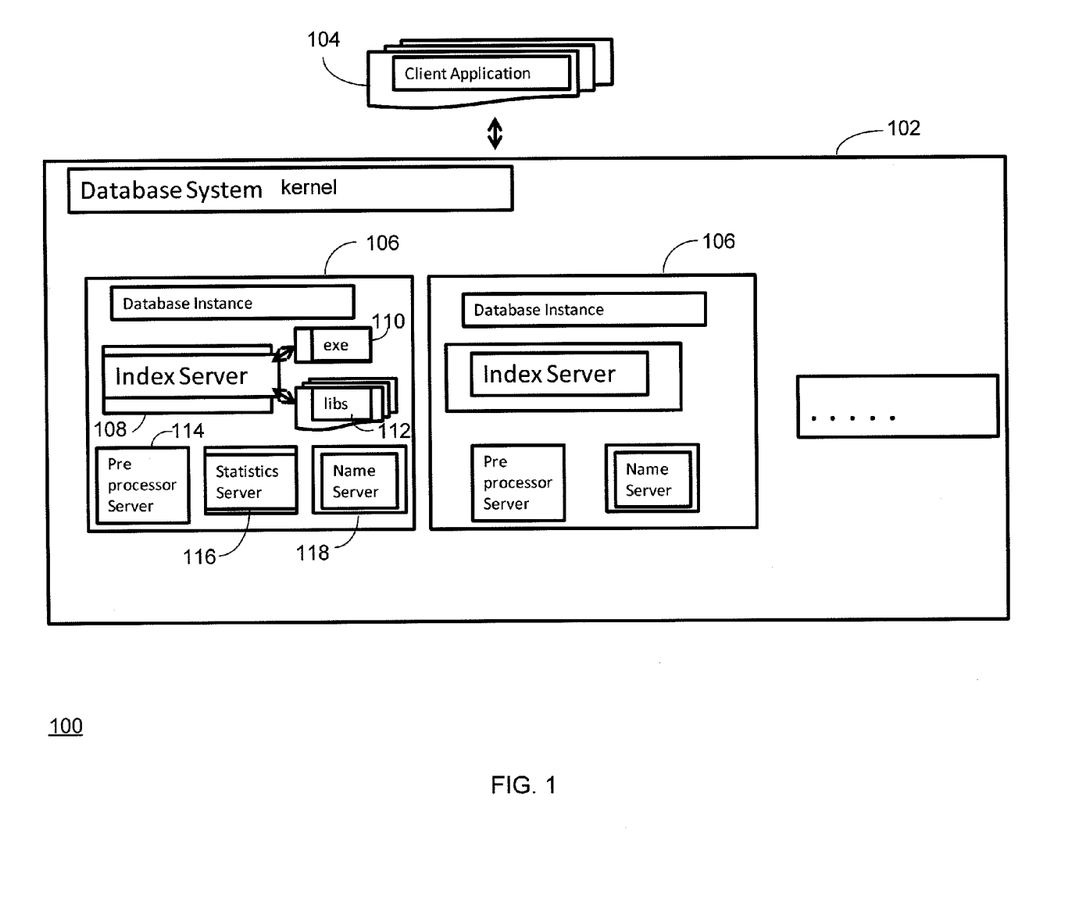
FIG. 1 is a diagram illustrating aspects of a system showing features consistent with implementations of the current subject matter.

FIG. 1 is a block diagram of a database system 100 and its kernel 102, which communicates with one or more applications 104. The database system 100 includes one or more database instances 106. Each database instance 106 includes an index server 108 that includes an executable module 110 and one or more libraries 112. Each database instance 106 can further include a pre-processor server 114, a statistics server 116 and a nameserver 118, the functions and operations of each of which is explained further below.

In-memory applications implemented into dynamic link libraries (DLLs) have to follow certain rules in order to enable a single framework to run application functionality in a common way from various areas. Newly built and dynamically added application function libraries are loaded and managed by a package manager.

Calling Functions in DLLS

A process for calling a function in a DLL includes either determining the address of the function symbol, casting the retrieved address to a function pointer that exactly matches the parameter list of the function, and executing the function pointer with the actual parameters if the function is a C-style function, or instantiating the class and running the method of this class instance if the function is a class method. Accordingly, for each dynamically linked function to be executed, a matching function pointer has to be defined in the kernel coding, i.e. the class function is a method that is known in the kernel coding. For running functionality from various areas in external libraries in a common way a standardized approach to build application libraries is used.

Parameter Metadata

One exemplary technique for calling a C++ routine is calling it as a database procedure, i.e., the execution of such a function is embedded in a callable statement. This requires that metadata, particularly metatdata on parameters of such a routine, be stored in the database catalog. To support powerful application logic via these routines, the routines have to support a wide set of parameters. For instance, when being called from ABAP reports, ABAP structures and ABAP internal tables are mandatory.

Hence, in accordance with some implementations, an XML-based approach is provided for describing parameters. The application developers just have to specify the parameters by using a few given XML constructs. This specification is part of the application coding belonging to the libraries, and during the creation of such a library, intelligent tools that process the XML documents generate C++ coding out of XML. The generated C++ coding fully describes the parameters of a routine in a way the database kernel can understand it when registering the routine as procedure. Next, the routines need to be called.

Calling Application Functions (AFS)

As mentioned previously, calling a C-style function in a DLL means determining the symbol address of the function, and then casting the retrieved pointer to a matching function pointer. The parameters to be given to the function pointer are built up in the calling environment, such as the SQL manager for a database procedure. A suitable function pointer must be defined in the database kernel.

For IMDB application functions in external libraries are methods of C++ classes of specific form, in what follows sometimes just called routines. When processing the XML parameter description of such a routine during the make process not only metadata in form of C++ coding is generated but for each routine also a C-style function with a special signature is generated, and therefore all of these so-called wrapper functions have exactly the same signature.

Such a function gets, as one parameter, an array of addresses that represent the parameters of the routine to be called. Due to the special structure of the libraries, i.e., routines are methods of C++ classes of a given form, the address array is mapped to the parameters of the routine to be called. The call of the routine, i.e., executing a method of the correct C++ class instance, is performed within such a wrapper function. Thus, for the C++ classes, the routines are methods that do not need to be known to the database kernel.

Accordingly, executing an AF includes but goes beyond getting the address of the generated wrapper function, casting the address to the function pointer known to the kernel, building the parameter array, and executing the function pointer. (Note, the name of the wrapper function the address is needed of can be derived from the AF that actually should be called.) Again, all generated functions wrapping database application functions to be called have the same signature. Due to that only one single function pointer has to be defined in the kernel coding to cover all AFs.

The described approach is not limited to calling C++ routines as procedures but also operators in calculation engine scenarios or functions that should be called within SQLScript procedures, to be precise L procedures, such as known Business Function Library BFL functions can be supported.

Application functions of a library are methods of a C++ class. The class follows a given derivation mechanism, the classes derives from an interface, and the class derives from a base class common to all such classes. The parameters of the methods are declared via XML. The XML extent is controlled by special schemas. The XML files belong to the library's make target. The processing of the XML files is done during the make of the library by a proprietary tool. The tool generates metadata on the application functions that will be stored in the catalog, and the tool generates, among others, for each application function a wrapper. The generated coding is C++ and compiled into the library.

Calling a function contained in an external library means
  loading the library,
  instantiating the component class in a very special way
    what returns its this pointer as void pointer to the kernel code,
  determining the address of the wrapper function,
  casting the address to an appropriate function pointer,
  building up the input and output parameters,
  calling the function pointer with the built-up parameters and the component class void pointer.

This applies to all kinds of external functions. If each external library would follow its own implementation paradigm then the above described steps needed to be implemented differently for each library. Further, things like library handle, function address, parameter description, . . . should be determined only once and should be reusable for consecutive calls of the function.

All application function libraries (AFLs) follow a given structure in order to enable the package manager to manage the necessary tasks efficiently. Additionally, only if one single instance manages all the tasks and keeps track about requested symbols and about cross-library references unloading a library safely is possible. The library structure is a generalization of the approach used for liveCache application libraries, which adopt some parts of Microsofts' Component Object Model COM such as its querying a class factory. This means, also AFLs reflect very few concepts and terms of COM.

Component Interface, Class, and Instance.

As already indicated, application functions to be implemented in an AFL are methods of a given class. The definition of the class depends on the area to which the functions belong. Common to all such functions is the derivation from class AFLBase. The methods are virtual methods of an interface the class is derived from as well. The interface is specific for the class, i.e., for different classes the interfaces look different. Such a class is called component class, and it's interface is called component interface.

The following file aflTest.h shows an example of a definition of an interface:

```
#ifndef _aflTest_h_
#define _aflTest_h_
#include "AFL/PackageManager/AFLPM_Defines.hpp"
#include "afltypes.h" /* no check */
static const AFLID aflTest_CLSID = { 0x16EB2BC5, 0x99DC, 0x4db2, { 0xAA, 0x82, 0xEA,
0x05, 0x74, 0x84, 0x66, 0xEE ) } };
static const AFLID aflTest_IID = { 0xA33741FC, 0xD6A4, 0x4100, { 0x90, 0x46, 0x2A,
0xF5, 0x84, 0x89, 0xE8, 0x24 } };
class IaflTest
{
public:
    STDMETHOD(QueryInterface)( const AFLID & iid,
                               void ** ppv ) = 0;
    STDMETHOD(TEST_F1)( ) = 0;
    STDMETHOD(TEST_F2)( /* in */ AflTypeInt4 IInt ) = 0;
    STDMETHOD(TEST_F3)( /* out */ AflTypeInt4 * OInt ) = 0;
    STDMETHOD(TEST_F4)( /* in */ AflTypeInt4 IInt,
                        /* out */ AflTypeInt4 * OInt ) = 0;
};
#endif // _aflTest_h_
```

The class has four methods TEST_F1 to . . . _F4 that should be called as procedures, functions, operators, . . . and a special method called QueryInterface which will be explained later.

Instead of procedures, functions, operators, . . . we just talk about application functions in what follows. Only if the specific type needs to be emphasized we get more precise.

A file like aflTest.h isn't written by an application developer, but instead an XML file is written. This XML file is processed by a proprietary tool as mentioned above called xml2ispc, the processing takes place during the compilation of the library. The tool generates from file aflTest.xml, among others, the file aflTest.h. Headers like aflTest.h aren't checked in into a source control system depot, but they are generated during the creation of the libraries and live only temporarily. The following header aflTestObj.h gives the definition of the component class:

```
#ifndef _AFLTESTOBJ_H_
#define _AFLTESTOBJ_H_
#include "AFL/PackageManager/AFLPM_Base.hpp"
#include "aflTest.h" /* dep=aflTest.xml */
class CaflTest : public AFLBase,
                 public IaflTest
{
public:
    CaflTest( ) { }
    virtual ~CaflTest( ) { }
    STDMETHODIMP QueryInterface( const AFLID & iid,
                                 void ** ppv )
    {
        *ppv = NULL;
        if (iid == aflTest_IID)
        {
```

-continued

```
            *ppv = static_cast<IaflTest *>(this);
        }
        if (*ppv == NULL)
        {
            return 1;
        }
        return 0;
    }
    STDMETHOD(TEST_F1)( );
    STDMETHOD(TEST_F2)( /*[in] */ AflTypeInt4    IInt );
    STDMETHOD(TEST_F3)( /*[out]*/ AflTypeInt4 * OInt );
```

-continued

```
    STDMETHOD(TEST_F4)( /*[in] */ AflTypeInt4    IInt,
                        /*[out]*/ AflTypeInt4 * OInt );
};
#endif // _AFLTESTOBJ_H_
```

The implementation in file aflTestObj.cpp looks as follows:

```
#include "AFL/PackageManager/Testing/aflTest4/aflTest4Obj.h"
#include "aflTest4Factory.h" /* dep=aflTest4.xml */
/*-------------------------------------------------------------*/
STDMETHODIMP CaflTest::TEST_F1( )
{
    AflTypeInt4 i = 0;
    return 0;
}
/*-------------------------------------------------------------*/
STDMETHODIMP CaflTest::TEST_F2( AflTypeInt4 IInt )
{
    AflTypeInt4 iint = IInt;
    return 0;
}
/*-------------------------------------------------------------*/
STDMETHODIMP CaflTest::TEST_F3( AflTypeInt4 * OInt )
{
    *OInt = -1;
    return 0;
}
/*-------------------------------------------------------------*/
STDMETHODIMP CaflTest::TEST_F4( AflTypeInt4    IInt,
                                AflTypeInt4 * OInt )
{
    *OInt = -IInt;
    return 0;
}
```

Beside the header file that defines the interface, in the example aflTest.4, three further files are generated out of the XML document by the tool xml2ispc.

The first one is the factory implementation in file aflTest-Factory.h as follows:

```
#ifndef _aflTestFactory_h_
#define _aflTestFactory_h_
#include "AFL/PackageManager/AFLPM_ClassFactory.hpp"
#include "aflTest.h"
extern "C" AFL_API HRESULT _stdcall
CreateAFLClassFactory( const AFLID & clsid,
                       const AFLID & iid,
                             void   ** ppv )
{
  if(clsid != aflTest_CLSID)
  {
    return 1;
  }
  CCFactory<CaflTest> * pFactory = new CCFactory<CaflTest>(aflTest_IID);
  if (pFactory == NULL)
  {
    return 1;
  }
  return pFactory->QueryInterface( iid, ppv );
}
#endif // _aflTestFactory_h_
```

25

The next one is the wrapper file, in our example, aflTest-Wrapper.h (see the program listing at the end of the detailed description).

The next one is the wrapper file, in our example, aflTest-Wrapper.h:

```
#ifndef _aflTestWrapper_h_
#define _aflTestWrapper_h_
#include "aflTest.h"
/*-------------------------------------------------------------------------*/
extern "C" AFL_API HRESULT _stdcall
TEST_F1_Wrapper(
  void *  pCOMIF,
  void ** pParamPtr,
  int     paramCnt )
{
  if (paramCnt != 0)
  {
    // error
    return 1;
  }
  IaflTest * pIfc = (IaflTest *)pCOMIF;
  HRESULT rc = S_OK;
  rc = pIfc->TEST_F1(
           );
  return rc;
}
/*-------------------------------------------------------------------------*/
extern "C" AFL_API HRESULT _stdcall
TEST_F2_Wrapper(
  void *  pCOMIF,
  void ** pParamPtr,
  int     paramCnt )
{
  if (paramCnt != 1)
  {
    // error
    return 1;
  }
  IaflTest * pIfc = (IaflTest *)pCOMIF;
  AflTypeInt4 param0 = *((AflTypeInt4 *)pParamPtr[0]); // GEN_PARAM_INT_TYPE
  HRESULT rc = S_OK;
  rc = pIfc->TEST_F2(
           param0
           );
  return rc;
}
/*-------------------------------------------------------------------------*/
```

```
extern "C" AFL_API HRESULT _stdcall
TEST_F3_Wrapper(
    void *  pCOMIF,
    void ** pParamPtr,
    int     paramCnt )
{
    if (paramCnt != 1)
    {
        // error
        return 1;
    }
    IaflTest * pIfc = (IaflTest *)pCOMIF;
    AflTypeInt4 * param0 = (AflTypeInt4 *)pParamPtr[0]; // GEN_PARAM_INT_TYPE_PTR
    HRESULT rc = S_OK;
    rc = pIfc->TEST_F3(
                param0
                );
    return rc;
}
/*-----------------------------------------------------------------------*/
extern "C" AFL_API HRESULT _stdcall
TEST_F4_Wrapper(
    void *  pCOMIF,
    void ** pParamPtr,
    int     paramCnt )
{
    if (paramCnt != 2)
    {
        // error
        return 1;
    }
    IaflTest * pIfc = (IaflTest *)pCOMIF;
    AflTypeInt4 param0 = *((AflTypeInt4 *)pParamPtr[0]); // GEN_PARAM_INT_TYPE
    AflTypeInt4 * param1 = (AflTypeInt4 *)pParamPtr[1]; // GEN_PARAM_INT_TYPE_PTR
    HRESULT rc = S_OK;
    rc = pIfc->TEST_F4(
                param0
                , param1
                );
    return rc;
}
#endif // _aflTestWrapper_h_
```

The last one named aflTestIspc.cpp contains metadata on the application functions and on their parameters in a form the metadata can be accessed by the database kernel.

The metadata is transferred to the database catalog by commands
  create package <logical name> file <library name>
  create applicationfunction <name> in <package>
issued for registering the AFL respectively all contained application functions.

In case of an application function of type procedure each instance of ptime::Connection within which the procedure is to be executed holds an instance of class AFLPM_ComponentInstanceManager.

For an application function to be called as plan operator each corresponding calculation plan node holds an instance of AFLPM_ComponentInstanceManager.

In case of an application function to called from within an L procedure the L engine hols an instance of AFLPM_ComponentInstanceManager.

For convenience, the case of an application function to be executed as procedure is described as follows.

Figure 2:
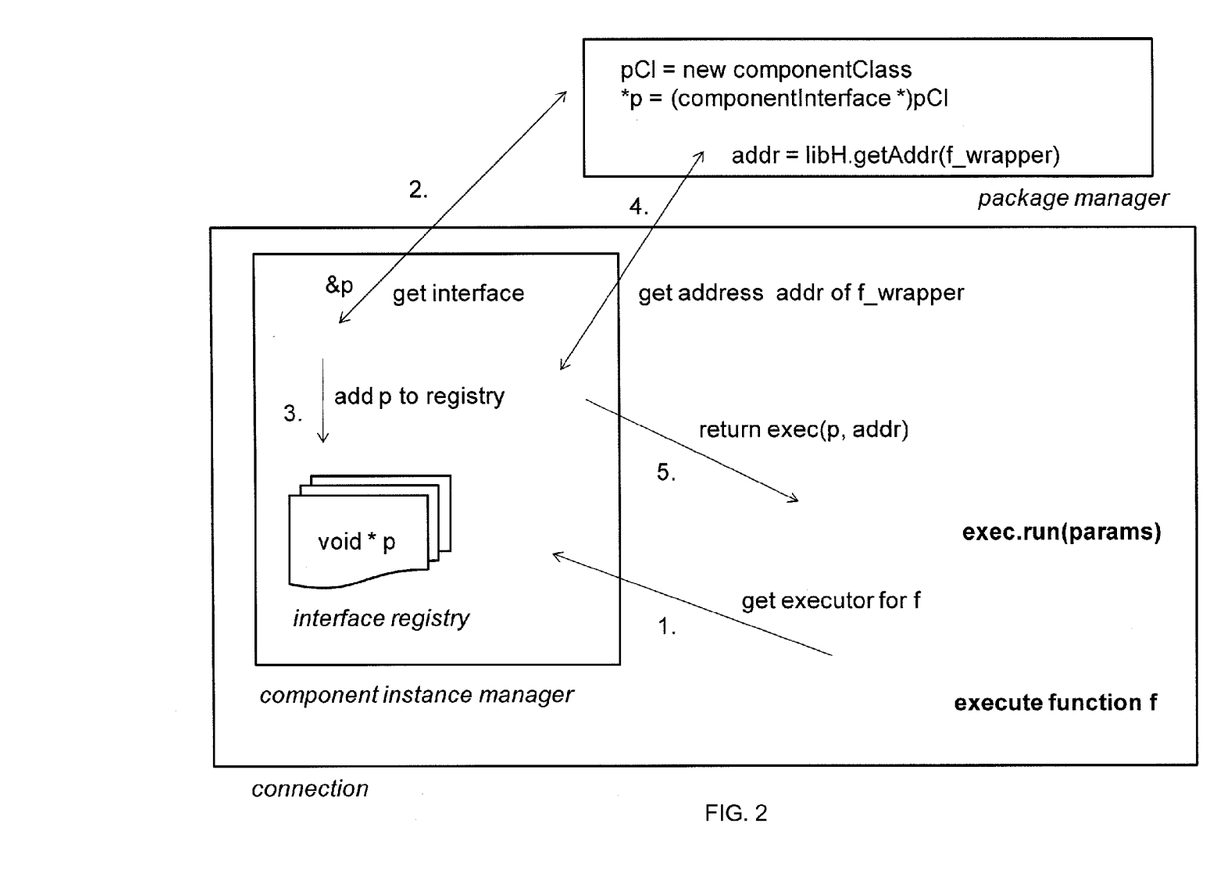
FIG. 2 is a process flow diagram a method for executing an application function.
Figure 3:
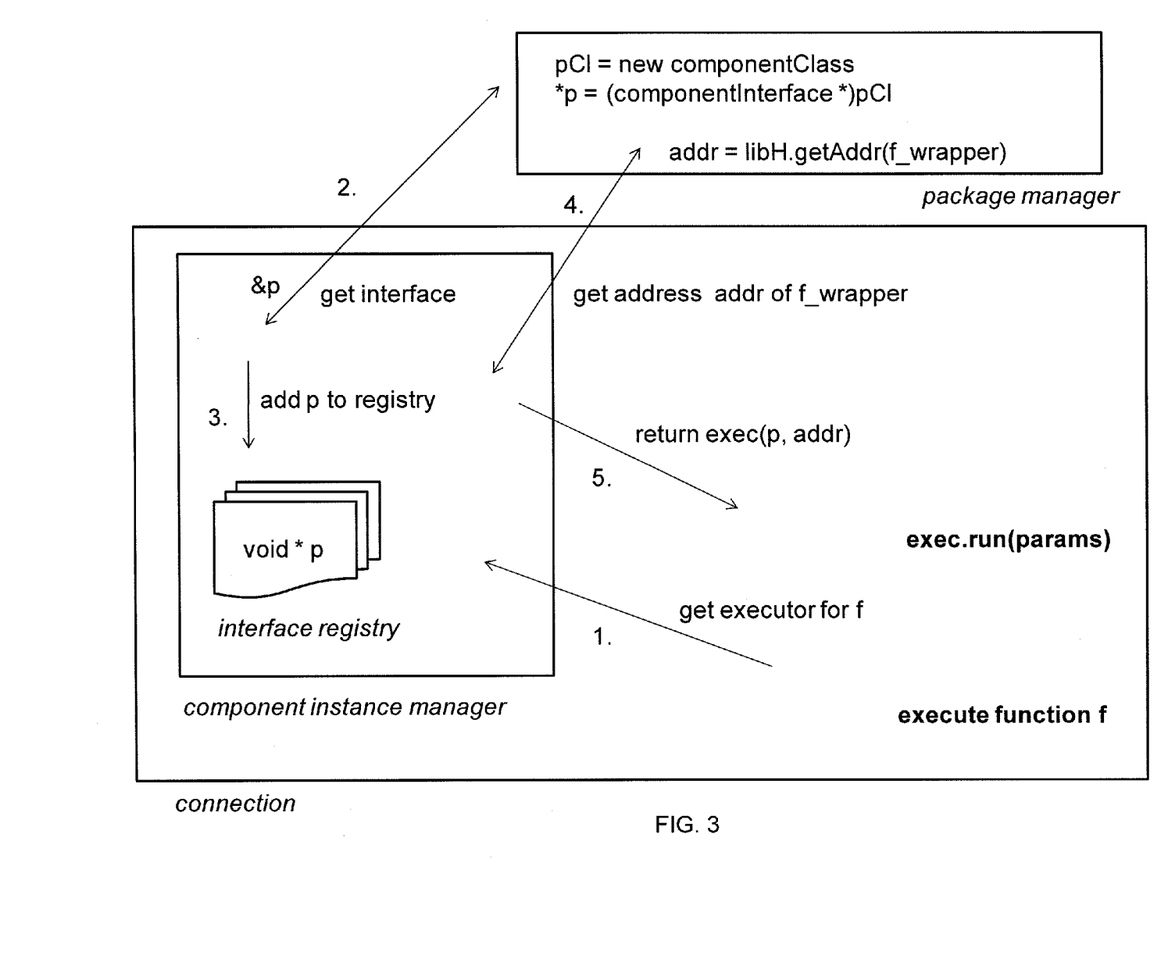
FIG. 3 is a process flow diagram illustrating features consistent with implementations of the current subject matter.

FIG. 2 is a process flow diagram illustrating a method 200 for executing an application function. Once an application function is to be executed within a connection (execute function f) the instance of the component instance manager is generated if it does not exist yet. From the component instance manager an executor for the application function to be executed is requested (1.).

The component instance manager generates an instance of the component class if it does not hold an instance yet. Actually the component instance manager does not generate the class instance by itself but requires the package manager to generate the class instance (2.). The package manager generates the component class instance via its class factory and returns it to the connection-local component instance manager (2.).

Of course the package manager does not return an instance of the component class or a pointer to the component class. However, the package manager returns a parameter ppV of type void ** where *ppV holds the this-pointer of the class instance casted to the class interface (2.) as void pointer, cf. aflTestFactory.h. For performing the cast the method called QueryInterface is needed, see aflTest.h and aflTestObj.h. ppV is the address of a void pointer the component instance manager stores in its component class interface registry (3.).

The component instance manager local to a connection stores a void pointer for each component class instance created for the connection. The value of such a void pointer is the this-pointer of the component class the pointer is used for casted to the component class interface.

The second information needed to execute an application function is the address of its wrapper function. The name of the wrapper can be derived from the function name. Together with the name of the package the function belongs to the component instance manager queries the package manager to get the address of the wrapper function (4.). Now the executer which is an instance of class AFLPM_ApplicationFunctionExeutor is returned (5.).

Finally, the executor is filled with the actual parameters and its run method is called (exec.run(params)). Each subsequent execution of the application function on this connection means assigning the actual parameter values to the executor and calling its run method again.

The parameters are mapped by the procedure dispatcher that controls the execution of the procedure into a void* array. The array has as many entries as the function has parameters. The void* array is allocated when preparing the execution of the application function.

The procedure dispatcher knows due to its knowledge of the metadata stored in the database catalog how to code the parameters into the void* array.

On the other side, i.e., within the library, the generated wrapper function knows how to decode the entries of the void* array and map them on the parameters of the method implementing the application function, cf. aflTestWrapper.h.

Further, within the wrapper the void pointer is casted to become a typed interface pointer. Now the method implementing the application function can be executed by alling it on the interface pointer, see aflTestWrapper.h for that as well.

Executing an application function, e.g., a as procedure, as operator in a calc-engine plan, as operator within a in an L procedure, . . . means the library has to be loaded, the wrapper address has to be determined, the parameters have to be tunneled across the kernel-library border to the wrapper, and the wrapper has to call the actual class method with the correct parameters. The call of the wrapper is done by an executor. The executor is run in the kernel layer to which the application function belongs, e.g., procedure dispatcher, calculation engine, or L engine. The execution of the application function is performed in the context of a ptime::Connection.

Accordingly, various applications that are programmed into external libraries will benefit from this approach, i.e., this approach supports all kinds of database application functions AFs when being implemented via the described standardized way into application function libraries AFLs.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims. The wrapper file aflTestWrapper.h:

```
#ifndef __aflTestWrapper_h__
#define __aflTestWrapper_h__
#include "aflTest.h"
/*---------------------------------------------------------------------------*/
extern "C" AFL_API HRESULT __stdcall
TEST_F1__Wrapper(
   void *                   pCOMIF,
   void **                  pParamPtr,
   int                      paramCnt )
{
   if (paramCnt != 0)
   {
     // error
     return 1;
   }
```

```
    IaftTest * pIfc = (IaftTest *)pCOMIF;
    HRESULT rc = S_OK;
    rc = pIfc->TEST_F1 (
            );
    return rc;
}
/*----------------------------------------------------------------*/
extern "C" AF_API HRESULT __stdcall
TEST_F2__Wrapper(
    void *              pCOMIF,
    void **             pParamPtr,
    int                 paramCnt )
{
    if (paramCnt != 1)
    {
        // error
        return 1;
    }
    IaftTest * pIfc = (IaftTest *)pCOMIF;
    AflTypeInt4 param0 = *((AflTypeInt4 *)pParamPtr[0]);
    // GEN_PARAM_INT_TYPE
    HRESULT rc = S_OK;
    rc = pIfc->TEST_F2(
            param0
            );
    return rc;
}
/*----------------------------------------------------------------*/
extern "C" AFL_API HRESULT __stdcall
TEST_F3__Wrapper(
    void *              pCOMIF,
    void **             pParamPtr,
    int                 paramCnt )
{
    if (paramCnt != 1)
    {
        // error
        return 1;
    }
    IaftTest * pIfc = (IaftTest *)pCOMIF;
    AflTypeInt4 * param0 = (AflTypeInt4 *)pParamPtr[0];
    // GEN_PARAM_INT_TYPE_PTR
    HRESULT rc = S_OK;
    rc = pIfc->TEST_F3(
            param0
            );
    return rc;
}
/*----------------------------------------------------------------*/
extern "C" AFL_API HRESULT __stdcall
TEST_F4__Wrapper(
    void *              pCOMIF,
    void **             pParamPtr,
    int                 paramCnt )
{
    if (paramCnt != 2)
    {
        // error
        return 1;
    }
    IaftTest * pIfc = (IaftTest *)pCOMIF;
    AflTypeInt4 param0 = *((AflTypeInt4 *)pParamPtr[0]);
    // GEN_PARAM_INT_TYPE
    AflTypeInt4 * param1 = (AflTypeInt4 *)pParamPtr[1];
    // GEN_PARAM_INT_TYPE_PTR
    HRESULT rc = S_OK;
    rc = pIfc->TEST_F4(
            param0
            , param1
            );
    return rc;
}
#endif // __aftTestWrapper_h__
```

What is claimed is:

1. A system comprising:
at least one programmable processor associated with an application server; and
a machine-readable medium storing instructions that, when executed by the at least one processor, cause the at least one programmable processor to perform operations comprising:
generating an instance of an application function;
generating an executor for the application function;
requesting an instance of a component class of the application function from a package manager of a database system;
accessing a void pointer associated with the instance of the component class, and a wrapper function address associated with the application function, the void pointer and wrapper function address comprising runtime parameters of the application function the accessing comprising:
defining an interface to an interface registry stored in a component instance manager;
receiving the interface to the interface registry; and
adding the void pointer to the interface registry via the interface; and
executing the application function by the executor according to the runtime parameters.

2. A computer-implemented method for executing an application function in a database system, the method comprising:
generating, by a component instance manager of a database system, an instance of the application function;
generating, by the component instance manager, an executor for the application function;
requesting, by the component instance manager, an instance of a component class of the application function from a package manager of the database system;
accessing, by the component instance manager, a void pointer associated with the instance of the component class, and a wrapper function address associated with the application function, the void pointer and wrapper function address comprising runtime parameters of the application function the accessing comprising:
defining, by the package manager, an interface to an interface registry stored in the component instance manager;
receiving, by the component instance manager, the interface to the interface registry; and
adding, by the component instance manager, the void pointer to the interface registry via the interface; and
executing the application function by the executor according to the runtime parameters.

3. A computer program product comprising a non-transitory, machine-readable medium storing instructions that, when executed by at least one programmable processor, cause the at least one programmable processor to perform operations comprising:
generating an instance of an application function;
generating an executor for the application function;
requesting an instance of a component class of the application function from a package manager of a database system;
accessing a void pointer associated with the instance of the component class, and a wrapper function address associated with the application function, the void pointer and wrapper function address comprising runtime parameters of the application function the accessing comprising:
defining an interface to an interface registry stored in a component instance manager;
receiving the interface to the interface registry; and adding the void pointer to the interface registry via the interface; and executing the application function by the executor according to the runtime parameters.

* * * * *